UNITED STATES PATENT OFFICE.

AUGUSTE WOLPERS, OF HAEMELERWALD, GERMANY.

CLEANING-PASTE AND PROCESS OF MAKING SAME.

SPECIFICATION forming part of Letters Patent No. 706,790, dated August 12, 1902.

Application filed March 20, 1902. Serial No. 99,204. (No specimens.)

*To all whom it may concern:*

Be it known that I, AUGUSTE WOLPERS, a subject of the Emperor of Germany, and a resident of Haemelerwald, in the Province of Hanover and Empire of Germany, have invented a new and useful Cleaning-Paste and Process of Making the Same, of which the following is a specification.

The subject of this invention consists, first, of a paste for cleaning gloves, particularly those formed of kid or other skins having a glacé finish, and, second, in a process for producing such paste.

The paste forming the subject of the present invention consists of soap, milk, and eggs.

The process by which this new paste is preferably formed is as follows: Soap (twelve hundred grams) is dissolved in one liter of hot milk and cooked until it reaches the consistency of a thick paste. Then after cooking is discontinued two eggs are stirred in, and the stirring is continued until the mass becomes cold.

This paste is used to clean kid gloves, especially kid gloves with glacé finish, and it has the advantage over all cleaning mediums that it restores to the leather its original new appearance, producing a very soft condition and does not change the color of the glove. Since the paste has no corrosive parts it will not attack the leather.

In using the paste a small quantity is smeared upon a soft rag, with which the glove is then rubbed lightly without pressure. When all uncleanliness has been removed in this manner, it will be found that the color of the glove appears as new, and the skin is soft and glossy.

Having thus described my invention, the following is what I claim as new therein:

1. A cleaning-paste, consisting of soap, milk and eggs intimately mixed.

2. The process of producing a cleaning-paste, which consists in cooking soap and milk until it reaches the consistency of a paste, and then adding eggs to the mixture, and stirring the whole until cold.

In testimony whereof I affix my signature in presence of two witnesses.

AUGUSTE WOLPERS.

Witnesses:
 LEONORE KASCH,
 C. C. STEVENSON.